H. SLADE.
Thill-Coupling.

No. 227,850. Patented May 18, 1880.

WITNESSES:
Frank G. Parker
Geo. O. G. Coale

INVENTOR:
Howard Slade

UNITED STATES PATENT OFFICE.

HOWARD SLADE, OF BOSTON, MASSACHUSETTS, ASSIGNOR TO CORDELIA J. SLADE, TRUSTEE FOR JOHN TUTTLE SLADE, OF SAME PLACE.

THILL-COUPLING.

SPECIFICATION forming part of Letters Patent No. 227,850, dated May 18, 1880.

Application filed October 11, 1879.

*To all whom it may concern:*

Be it known that I, HOWARD SLADE, of Boston, in the county of Suffolk and State of Massachusetts, have invented a new and useful Improvement in Shaft-Couplings for Carriages, of which the following is a full, clear, concise, and exact description, reference being had to the accompanying drawings, making a part hereof.

One great fault found with all shaft-couplings heretofore known to me has been that the shafts continually rattle when the carriage is in use, owing to the play of one part of the coupling against the other. Many attempts have been made to do away with this noise, but hitherto without success.

My improvement consists in a coupling in which the shaft-eye, or part of the coupling upon the shaft, has a cylindrical hole passing through it, provided with screw-threads, forming a female screw, into which fits snugly a cylindrical bolt, also provided with screw-threads, and serving to secure the shaft-eye to the jigger-clasp, or part of the coupling upon the axle, the whole operating in a way now to be described.

Figure 1:
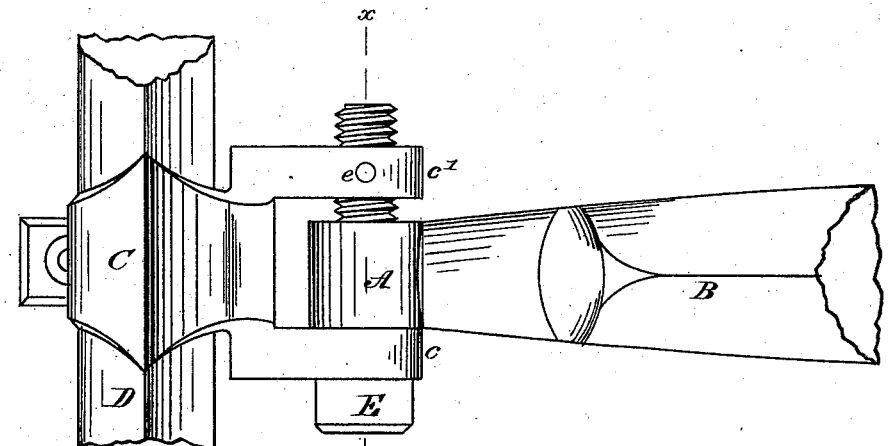
Figure 2:
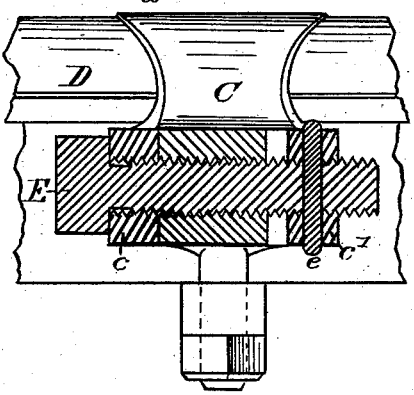

In the drawings, Figure 1 is a plan, and Fig. 2 is a cross-section on the line $x\ x$ of Fig. 1, of a coupling embodying my invention.

A is the shaft-eye, fastened to the end of the shaft B, and adapted to receive the bolt E, which acts as a hinge-pin. C is the jigger-clasp, having two ears, $c\ c'$, each of which is provided with a hole to receive the bolt E, as shown, these ears $c\ c'$ and the shaft-eye A forming the two parts of a hinge or coupling joined by the hinge-pin E. The distance apart of the ears $c\ c'$ must always be greater than the width of the shaft-eye to allow for the traveling of the shaft-eye upon the bolt, as spoken of below. The jigger-clasp C is securely fastened to the axle D.

E is a bolt used as a hinge-pin, as above described, and having screw-threads cut in nearly its entire length, as shown.

The interior of the shaft-eye A is provided with screw-threads, forming a female screw adapted to fit perfectly the threads on the bolt E, and consequently when the shafts are in place there can be no lateral movement of the shaft-eye A upon the bolt E, and no rattling of the parts A and C against each other, provided the screw E be held in place in the jigger-clasp C.

I prefer to furnish the holes in $c\ c'$ with screw-threads fitting the threads on the bolt E, and to pass a pin, $e$, through one of the ears $c\ c'$ and the bolt E, as shown, this forming a simple and easy means of keeping the bolt E in place.

The bolt E is made cylindrical in order that its screw-threads may fit the screw-threads in the cylindrical hole in the shaft-eye and prevent the shaft-eye from moving laterally, whether the bolt be screwed so that its head is jammed against the ear $c$ or whether one or more washers are placed between its head and the ear $c$. Hence the position of the bolt in the coupling can be changed at any time, if, for example, the threads should become so worn that they do not fit exactly.

It is also best, when fastening a pair of shafts to a carriage by means of my coupling, to allow the farther ends of the shafts to rest on the ground, and to hold the shaft-eye A very near to the ear $c$, which first receives the bolt E, so that when the ends of the shafts are raised from the ground after the screw E is in place and the shaft-eye A has traveled along the screw E a short distance, depending in length upon the pitch of the screw-thread, it will bind tightly against the ear $c$ and be held by it as well as the screw-threads.

Figure 3:
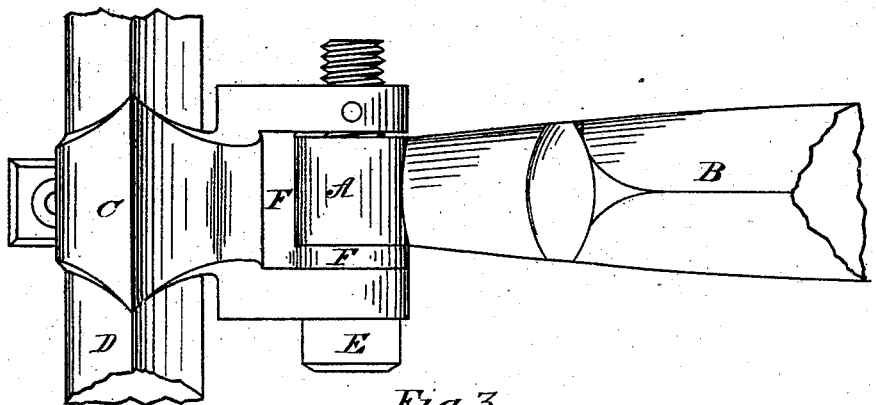

If desired, my coupling may be packed with rubber in any convenient way—for example, as shown in Fig. 3, F being a piece of rubber, part of which forms a washer around the bolt, the rest forming a packing behind the shaft-eye.

My device is simple, but very effective. It can be made with very little expense, and does away entirely with all the objectionable features of the couplings now in use. By means of it the shafts are securely held in place, and although they are hinged to the axle, there can be no lateral motion of one part of the hinge upon the other.

What I claim as my invention is—

A shaft-coupling consisting of the jigger-clasp C, provided with ears $c\ c'$, the shaft-eye B, having a cylindrical hole passing through it, provided with screw-threads, and the cylindrical bolt E, also provided with screw-threads, combined together substantially as described, the shaft-eye being adapted to travel upon the bolt E between the ears $c\ c'$, as and for the purposes set forth.

HOWARD SLADE.

Witnesses:
GEORGE O. G. COALE,
CHARLES ALMY, Jr.